United States Patent [19]

Berkson et al.

[11] Patent Number: 5,627,348

[45] Date of Patent: May 6, 1997

[54] ELECTRONIC STYLUS WITH WRITING FEEL

[75] Inventors: Mitchell Berkson, Providence, R.I.; David Arthur, Norwood, Mass.

[73] Assignee: A.T. Cross Company, Lincoln, R.I.

[21] Appl. No.: 418,938

[22] Filed: Apr. 7, 1995

[51] Int. Cl.⁶ ............................................. B08C 21/00
[52] U.S. Cl. ...................................... 178/18; 345/179
[58] Field of Search .......................... 178/18, 19, 20; 345/173, 179, 180, 181; 382/313, 314, 315; 341/5

[56] References Cited

U.S. PATENT DOCUMENTS

| | | |
|---|---|---|
| 235,898 | 7/1880 | Rogers . |
| 918,833 | 4/1909 | Every . |
| 1,028,029 | 5/1912 | Killebrew . |
| 1,171,146 | 1/1916 | Scribner . |
| 1,500,426 | 8/1924 | Townsend . |
| 1,915,426 | 6/1933 | Kohler . |
| 3,707,098 | 12/1972 | Kern . |
| 3,760,660 | 9/1973 | Van Arnam et al. . |
| 4,034,155 | 7/1977 | Muller et al. . |
| 4,158,747 | 6/1979 | Muller et al. . |
| 4,667,182 | 5/1987 | Murphy ................................... 178/18 |
| 4,786,764 | 11/1988 | Padula et al. . |
| 4,883,926 | 11/1989 | Baldwin ................................... 178/18 |
| 5,159,321 | 10/1992 | Masaki et al. . |
| 5,357,062 | 10/1994 | Rockwell ................................. 178/18 |
| 5,440,080 | 8/1995 | Nagaoka et al. ......................... 178/18 |
| 5,466,895 | 11/1995 | Logan ...................................... 178/18 |

OTHER PUBLICATIONS

IBM Tech Discl. vol.: 16 No. 12 May 1974.

*Primary Examiner*—Curtis Kuntz
*Assistant Examiner*—Paul Loomis
*Attorney, Agent, or Firm*—Colucci & Umans

[57] ABSTRACT

A non-marking, writing system simulates a physical writing system which has characteristic ranges of writing resistance, sound, resilience and thermal conductivity. The non-marking writing system includes a non-marking writing instrument having an elongated shank with opposite ends. A non-marking tip is connected to one end of the shank for engagement against and movement across a writing surface. The writing surface onto and across which the tip is moved for non-marking writing, creates an actual writing resistance. The tip is structured and made of selected material and the writing surface is made of selected material so that the actual writing resistance falls within the characteristic range of writing resistance for the physical writing system.

49 Claims, 13 Drawing Sheets

ELECTRONIC STYLUS WITH WRITING FEEL

FIELD AND BACKGROUND OF THE INVENTION

The present invention relates, in general, to electronic styli, and in particular, to a new and useful, non-marking, writing system which feels like an actual, physical writing instrument when used.

A pen-type computer input device which performs physical writing much like a ball-point pen on a writing surface, is disclosed by U.S. Pat. No. 5,159,321. A ball writing instrument is disclosed in this patent which leaves an ink mark on a writing surface as a ball rotates in its housing, in front of a reservoir of ink. In addition to leaving an ink mark, U.S. Pat. No. 5,159,321 discloses the use of a sensor for sensing the rotation of the ball. The rotation is used as an input to a computer, much like the rotation of a ball in a computer mouse is utilized to drive a cursor or otherwise convert movement of the mouse into location signals for the computer. Also see IBM Technical Disclosure Bulletin, Volume 16, No. 12, May 1974 which discloses a ball-point pen that includes accelerometers for detecting the movement of the writing instrument to record a pattern executed during a writing operation.

U.S. Pat. No. 4,034,155 discloses an electrical sensing writing pen which, in addition to executing a writing function, is used in conjunction with a writing surface to electronically detect and convey the position of the writing instrument on the writing surface for computer purposes.

Non-writing styli are also known which are used much the way a pen or pencil is used, but which leave no mark on a tablet or other computer equipment having a flat surface which is used with the stylus as an input device. Examples of these non-writing styluses can be found in U.S. Pat. Nos. 4,158,747 and 4,786,764 as well as 3,760,660; 3,707,098; 918,833 and 235,898. Styli for writing on a thick stack of carbon paper are also known which use a rolling ball in a housing. No ink is left by the ball but the ball is mounted in a lubricating housing or babbitt. See for example, U.S. Pat. Nos. 1,028,029; 1,171,146; 1,500,426; and 1,915,426. No effort is made in these structures to reproduce any particular writing feel but instead, a structure which can press much harder than normal writing pressure is provided. A computer stylus having a switch and a ball at the end without ink is also disclosed in U.S. Pat. No. 4,883,926. While the stylus is mentioned to have the proper "feel", as if the operator was using a pen or pencil, nothing in this reference suggests how this feel can be achieved.

In addition to computer input devices in the form of tablets, integral computer systems, known as personal digital assistance or PDA's, are known. These systems, exemplified by the Apple Newton Message Pad, include a wireless passive stylus which has a synthetic tip that is used like a writing instrument on an input panel of the device. The input panel is pressure sensitive and detects the instantaneous location of the synthetic tip, to record a virtual writing operation, such as the formation of letters and numbers, the creation of drawings, a signature and other writing operations which, if executed with a true physical writing instrument, will leave a mark, but which, in their electronic analogy, leave an electrically stored pathway to be reproduced on the writing surface, and which also is electronically stored. The pathway thus stored can either be subjected to character recognition software to determine whether the pattern contains identifiable symbols such as known numbers or letters, or can be stored simply as an image.

The A.T. Cross Company, assignee of the present application, has conducted subjective testing of existing desktop electronic digitizer tablets and PDA's and has demonstrated that using these tablets is less comfortable and less satisfying than conventional physical writing.

Quantitative testing by A.T. Cross Company has shown that existing virtual writing systems do not fall within a measured range of parameters which is found to be aesthetically satisfying and which characterizes physical writing.

SUMMARY OF THE INVENTION

The main object of the present invention is to provide an apparatus and method which can replicate the quantitative characteristics of a high-quality physical writing experience. In accordance with the present invention, a stylus tip arrangement and selected writing surface material has been discovered and developed which closely approximates a physical writing experience by mimicking various parameters of the experience, including writing resistance, resiliency, acoustic characteristics, smoothness and even surface warmth and hand friction of a conventional writing surface.

In accordance with the invention, the virtual or electronically tracked and recorded writing experience is thus made to mimic and feel like a physical writing experience, and in a preferred embodiment of the invention, the feel of a ball-point pen writing on paper. In the broader sense, the present invention can be used to synthesize and mimic other writing experiences such as felt or fountain pens on paper, lead pencils on paper, or in extreme cases, even the feel of chalk, crayons and brushes.

The present invention is a non-inking, that is a non-physical, writing system, that "feels" like a pen or other conventional writing instrument on paper. Such a writing system is of particular value in the field of electronic digitizing tablets and PDA's. A preferred embodiment of the invention is comprised of a hard ball mounted for free rotation in a socket, and a writing surface. The ball is in the range from 0.010" to 0.250" in diameter. The characteristics important to achieving an experience similar to a conventional writing experience have been quantified and include:

1. Writing resistance: The drag felt as a pen is moved across a writing surface. This is equal to the force required to move a pen across a writing surface.

2. Sound: The acoustic characteristics of the writing instrument as it is used. Examples include scratchiness, tapping and squeaking.

3. Resilience: The springiness of the writing instrument/ writing surface measured perpendicular to the plane of the writing surface.

4. Surface warmth: Thermal conductivity of the surface (against the hand resting on it).

5. Hand friction: Coefficient of friction between the hand and the writing surface.

An important distinguishing characteristic of the invention from existing styli/pad systems is the location of the system in a quantitatively characterized multidimensional quality writing space. Actual testing shows that existing electronic systems do not fall within the quantitative range of measurements found in aesthetically satisfying physical writing. There are numerous examples of products in the electronic digitizer industry which fail to achieve the tactile effect of writing with a conventional pen on a paper pad.

It is another object of the present invention to replicate the feeling of writing with an inked ball-point pen on paper (as quantified in the aforementioned multidimensional space) with an electronic stylus and a writing surface material or materials. It is a further object of the present invention that the materials used in the invention will provide an acceptably long life and that the invention be manufacturable. Materials of fabrication for the invention have been identified which achieve the goal of long life.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

According to the present invention, subjective testing was conducted on existing desktop electronic digitizer tablets, on personal digital assistance (PDA's) and on a variety of conventional writing instruments on various writing surfaces. The results of these tests demonstrated that writing on tablets and on PDA's was less comfortable than conventional physical writing. For the purpose of this disclosure, physical writing or marking means the use of a writing instrument to leave a mark or trail on a writing surface, such as an ink trail or a pencil trail, where substance is left by the writing instrument. The term "non-marking" writing is used to identify a virtual writing instrument or system where an elongated pen-like structure is held in the hand like a conventional physical writing instrument, and moved over a surface in a physical writing operation, but which leaves no marking on the surface.

The results of the subjective tests revealed that one of the favored modes of writing is writing with a ball-point pen on paper. This, however, did not correspond with the feel that is experienced when writing with a non-marking writing system, in particular, an active or passive stylus used in conjunction with a digitizer tablet or PDA screen.

Part of the present invention comprises the methodology of quantifying, and then replicating the characteristics which distinguish an aesthetically satisfactory writing experience, for example, one exemplified by writing with a pen on paper, when using a non-marking writing instrument or system.

Figure 1:
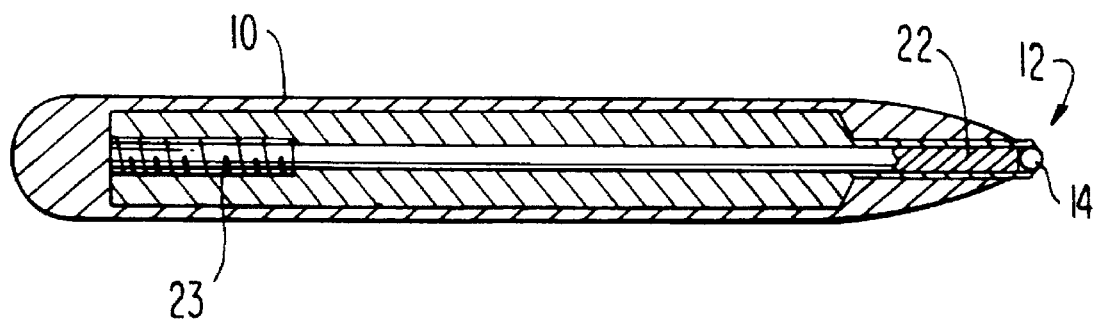
FIG. 1 is a sectional schematic view of a non-marking writing instrument in accordance with the present invention.

The preferred non-marking writing instrument, according to the present invention, is illustrated in FIG. 1. The instrument comprises an elongated shank 10 of a length and diameter corresponding to those of conventional marking instruments. Shank 10 may contain any devices needed to form an active or passive, wireless or wired electronic stylus.

Figure 2:
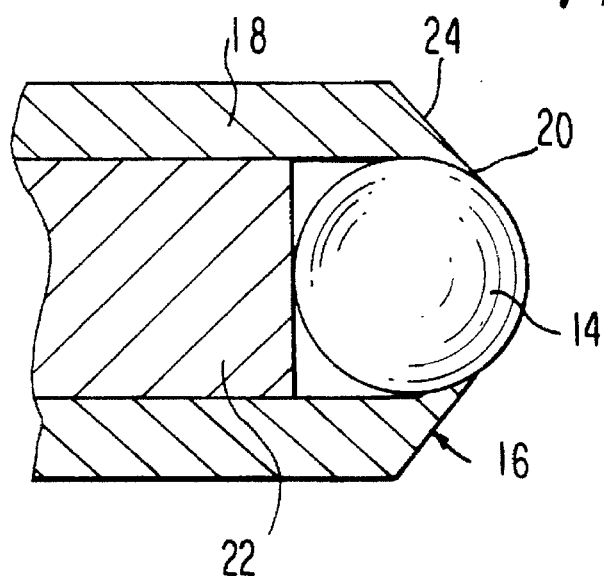
FIG. 2 is an enlarged sectional view of the tip of the instrument of FIG. 1.

A non-marking tip, generally designated 12, is positioned at one end of shank 10 and, as best shown in FIG. 2, comprises a hard material ball or sphere 14 having a diameter in the preferred range of 0.010" to 0.250". One example of the tip ball 14 has a diameter of ⅛" (0.125") and is made of chrome steel. Ball 14 is held within a capturing socket 16 advantageously made of brass for free rolling of the non-marking ball 14. Socket 16 comprises a cylindrical housing 18 with a retaining cone 20 defining an opening through which a portion of the outer surface of ball 14 projects for allowing contact with a writing surface. A brass plug 22 is mounted behind ball 14. Threads 23 hold the opposite end of plug 22 against ball 14.

Other configurations include loading a ball into the front end of a plastic "snap-fit" housing, or loading it into the front end of a brass (or other metal) housing followed by a crimping process to contain the ball in the housing. The latter process is similar to the conventional process used to manufacture ball pens.

Materials other than steel and brass may be used as long as the rolling friction of ball 14 in socket 16 is sufficiently low to permit rolling of the ball in the socket, without requiring ink or other fluid as a lubricant. Note also that careful selection of the ball and socket materials can result in a tailored "drag" which corresponds directly to a desired writing resistance. Since the non-marking writing instrument of the invention is meant for use on digitizer tablets, the screens of PDA's and other electronic instruments, care must be taken to avoid leaving deposits or residues on the screens. This precludes the use of a marking substance such as ink. The use of lubricating substances such as oil or grease is also not desirable or advantageous although a fluid or dry lubricant can be used as long as it is not deposited onto the writing surface.

The forward conical surface 24 of housing 18 is at an acute angle to the axis of the writing instrument, for example, less than about 45°, and the convex outer surface of ball 14 projects from the cone 20 sufficiently to permit execution of the writing operation at a conventional and reasonable writing angle for the writing instrument.

Figure 3:
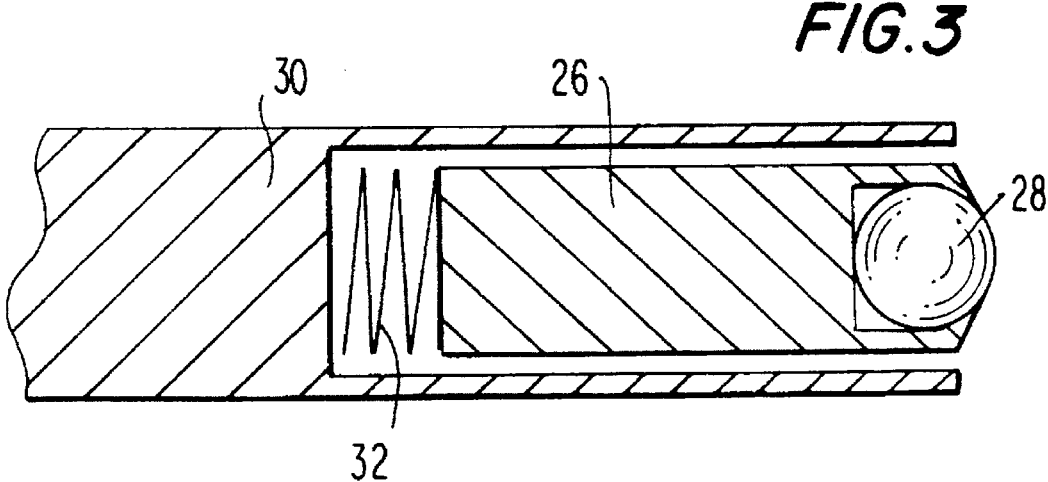
FIG. 3 is a view similar to FIG. 1 of another embodiment of the tip.

FIG. 3 illustrates an alternative embodiment of the invention which utilizes a housing 26 encasing a dry rolling ball 28. Housing 26 is positioned within an instrument case 30 and is mounted on a spring 32 which allows a short stroke for housing 26. The purpose of the embodiment of FIG. 3 is to mimic the resiliency of a writing surface, where the writing surface itself does not have such resiliency, by use of a spring or biasing means for pressing against the non-marking ball 28. To this end, the resiliency of spring 32 is relatively stiff and allows only slight rearward movement of housing 26.

Another and preferred mechanism for achieving the desired resiliency for the writing surface, is to use a selected material for the writing surface. When using the embodiment of FIG. 2 with no spring loading, the inventors have found a preferred surface material is a brand of cellular urethane known by the commercial name PORON, produced by Rogers Corporation of Rogers, Connecticut, and more accurately identified as cellular urethane no. 4701-05-30031-1637.

Other materials for the rolling ball and for the writing surface are also within the scope of the present invention and are listed later in this disclosure.

The purpose of using the rolling ball configuration of FIGS. 1–3, as well as selecting the material for the writing surface in accordance with the writing system of the present invention, is to reproduce certain parameters which were found important in recreating a desirable writing feel, for the non-marking system of the invention. According to the invention, five parameters were of primary interest, namely writing resistance, sound or acoustic quality, resilience, hand friction and surface warmth. In an optimal non-marking writing system, one can envision these five parameters plotted in a five dimensional space which is referred to here as the quality writing experience space. Each of the parameters represents an axis in this model. Although all five parameters, collectively, define the space, not all five parameters must be observed to reproduce a satisfactory writing feel. Further, in order to better understand the significance of the parameters, it is more instructive to view them singly or in pairs.

Figure 4:
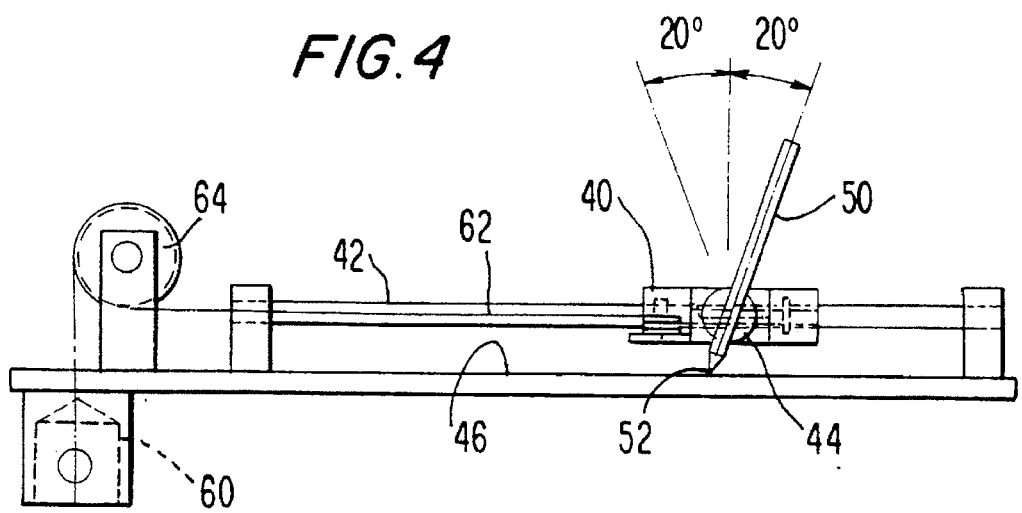
FIG. 4 is a schematic side elevational view of an instrument used in accordance with the present invention.

FIG. 4 illustrates an instrument which was used to quantify one of the parameters, namely writing resistance. The apparatus comprises a linear ball bearing block 40 which is mounted for low friction sliding along a linear ball spline 42. A writing instrument holder 44 is mounted to block 40 for rotation about a horizontal axis. A writing instrument 50 to be tested is firmly held in holder 44 and can be rotated to a variety of angles. For the tests, the writing instrument was fixed in a vertical position, perpendicular to a writing surface 46 over which the tip 52 of the writing instrument 50 was dragged. Writing instrument 50 in FIG. 4 is shown at a more natural writing angle of 20° to the vertical. A resistance testing machine 60, specifically a Zwick 1445 Universal Testing Machine with 200 N load cell, was attached to block 40 by a monofilament line 62 which was engaged around a pulley 64 before it was connected to the load cell of the testing machine. 136 grams of downward force was applied to the writing instrument 50 for pressing writing tip 52 against the writing surface 46. This corresponds to a typical writing pressure. A typical writing speed is approximately 121" per minute. The top speed for conducting the tests, however, was 30" per minute, corresponding to the linear movement of tip 52 across writing surface 46. The test results for writing speeds of either 10" or 30" per minute were accumulated.

Figure 5:
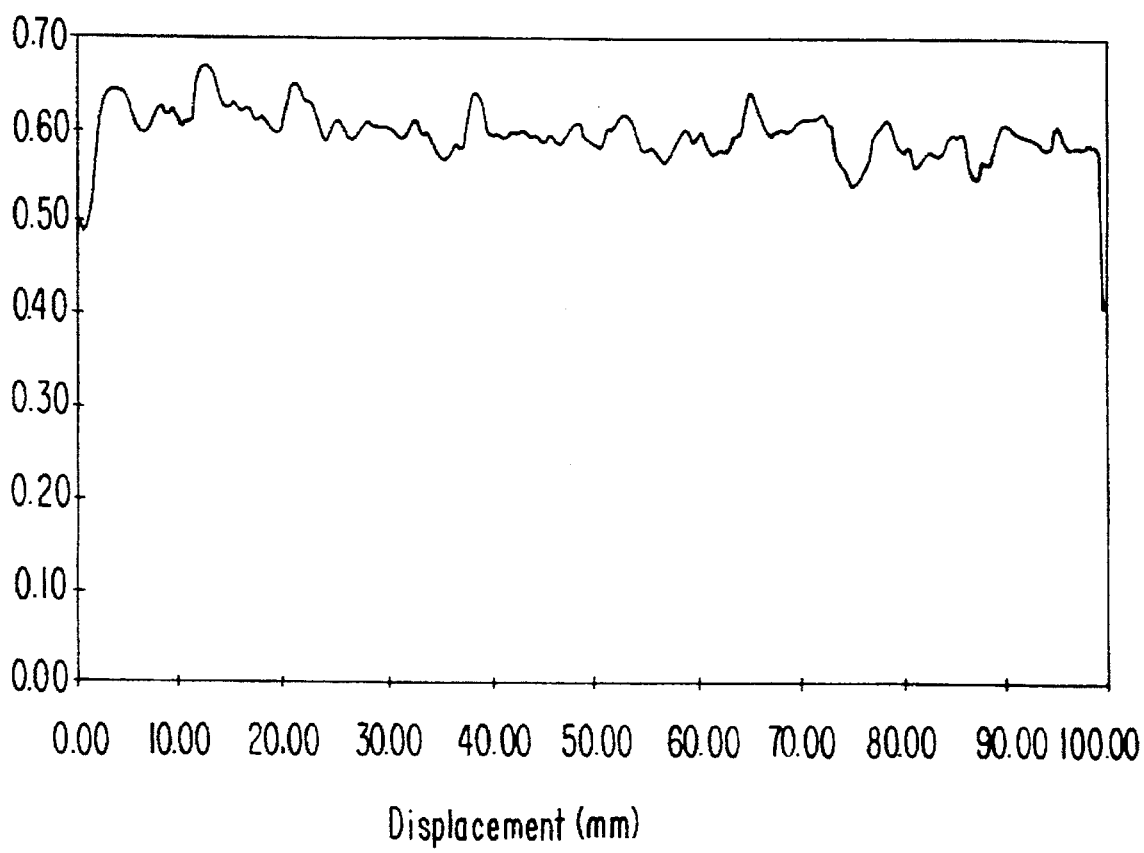
FIG. 5 is a graph plotting writing against displacement resistance, and illustrating the results of a typical run using the apparatus of FIG. 4.

FIG. 5 illustrates data which is typical of a resistance test run. In order to arrive at a single value for writing resistance, an average was taken of the resistance values recorded near the center of the curve in FIG. 5, specifically between 10 mm and 90 mm. The end parts of the curve were discarded because the data accumulating during the starting and stopping of the test was not typical. For the test run illustrated in FIG. 5, an average writing resistance of 0.59 Newton (N) was observed. FIG. 5 illustrates the results for a black ball-point pen manufactured by A.T. Cross Company, writing on a pad of paper.

Figure 6:
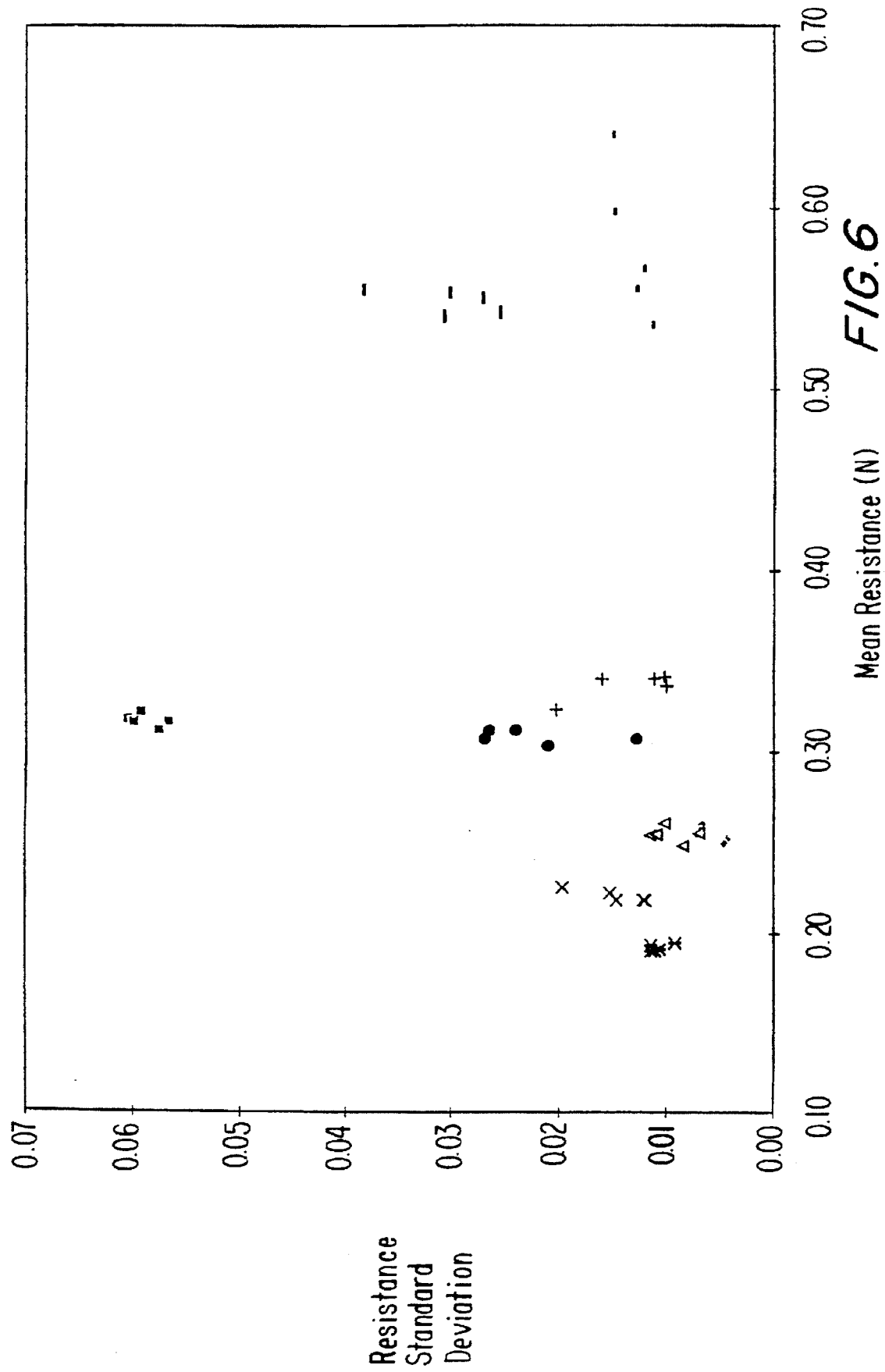
FIG. 6 is a two-dimensional scatter plot plotting a mean writing resistance against a standard deviation for the resistance, for various known writing instruments which are both of the marking and non-marking types.
Figure 7:
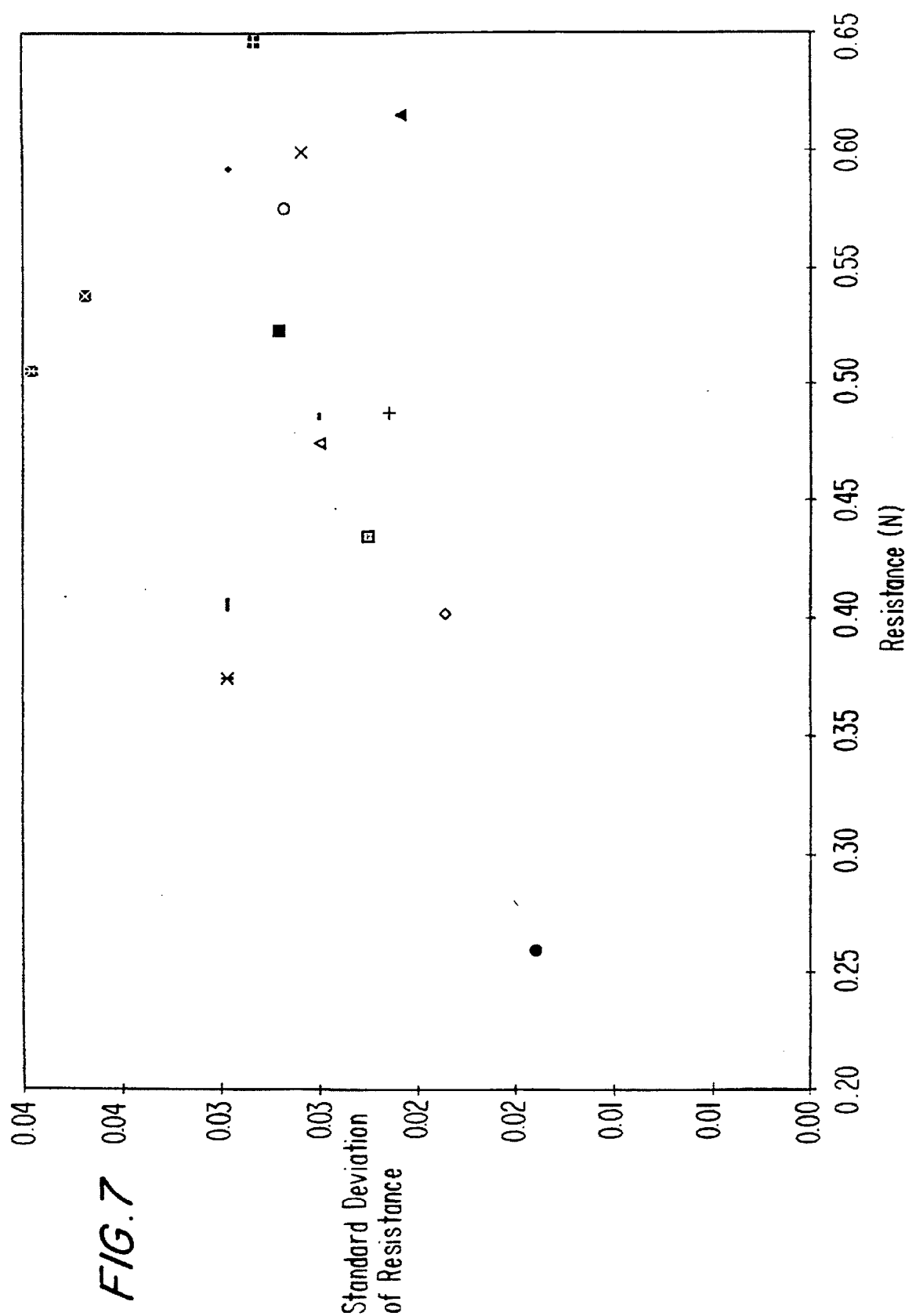
FIG. 7 is a plot similar to FIG. 6 of writing resistance against standard deviation therefor, of additional writing systems.

To identify a quality writing experience, the characterization of conventional ball pens, rolling balls and pencils were examined. FIGS. 6 and 7 disclose the results of writing resistance tests for the various listed writing systems.

Resilience testing was done by mounting the writing instrument vertically in a chuck in the Zwick tester. The tester was then moved at a low speed, pressing the writing instrument vertically into the writing surface, until a force of 175 grams was measured. Then the tester direction was reversed and the writing instrument was lifted off the writing surface.

The desired measurement is the force per unit distance required to push a writing instrument into a writing surface.

The speed of these tests was 0.25 in/min., except for one set of tests done at 0.75 in/min. to see if the test speed affected the results. Higher speeds were less desirable because the machine was able to take fewer samples especially when testing a stiff surface.

Figure 11:
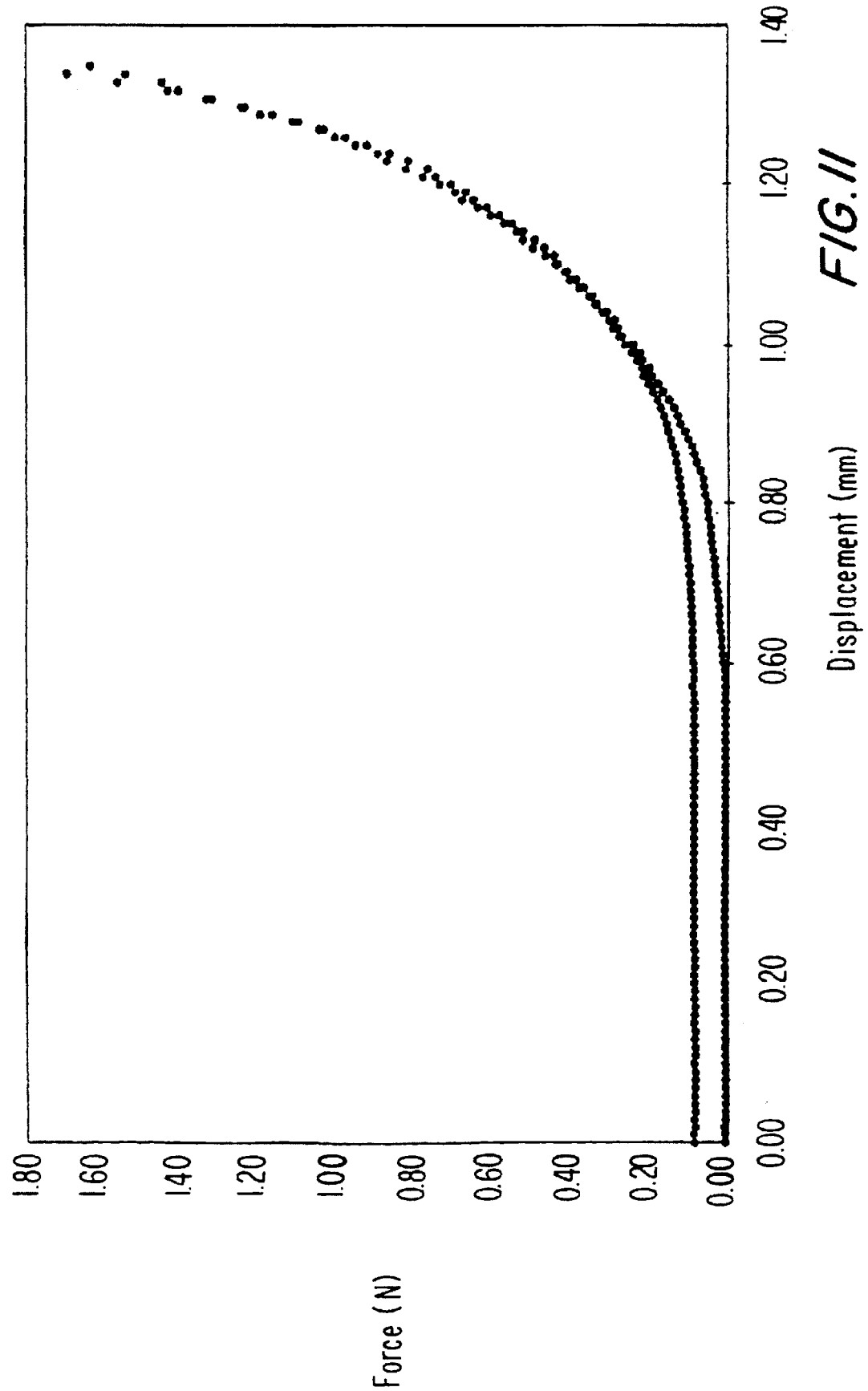
FIG. 11 is a graph plotting the results of a resiliency test for the writing surface.

FIG. 11 shows data typical of the resilience testing. The curve shown is from a test on an A.T. Cross ball-point pen refill on a paper pad. The data shown were taken during both downward and upward motion of the tester. Since the data in these two regimes were very similar, it can be concluded that very little permanent deformation had occurred to the writing surface or the writing instrument.

In order to arrive at a single value for writing system resilience, a best fit straight line was calculated, mathematically, for the straightest portion of the resilience curve. The portion of the curve to be used was subjectively decided based on the straightest looking portion. For the data in FIG. 11, the straight portion is between 1.20 and 1.35 mm. The slope of this line corresponds to and is in the same units as a spring constant. For this system, this value is 5.90 N/mm.

Figure 8:
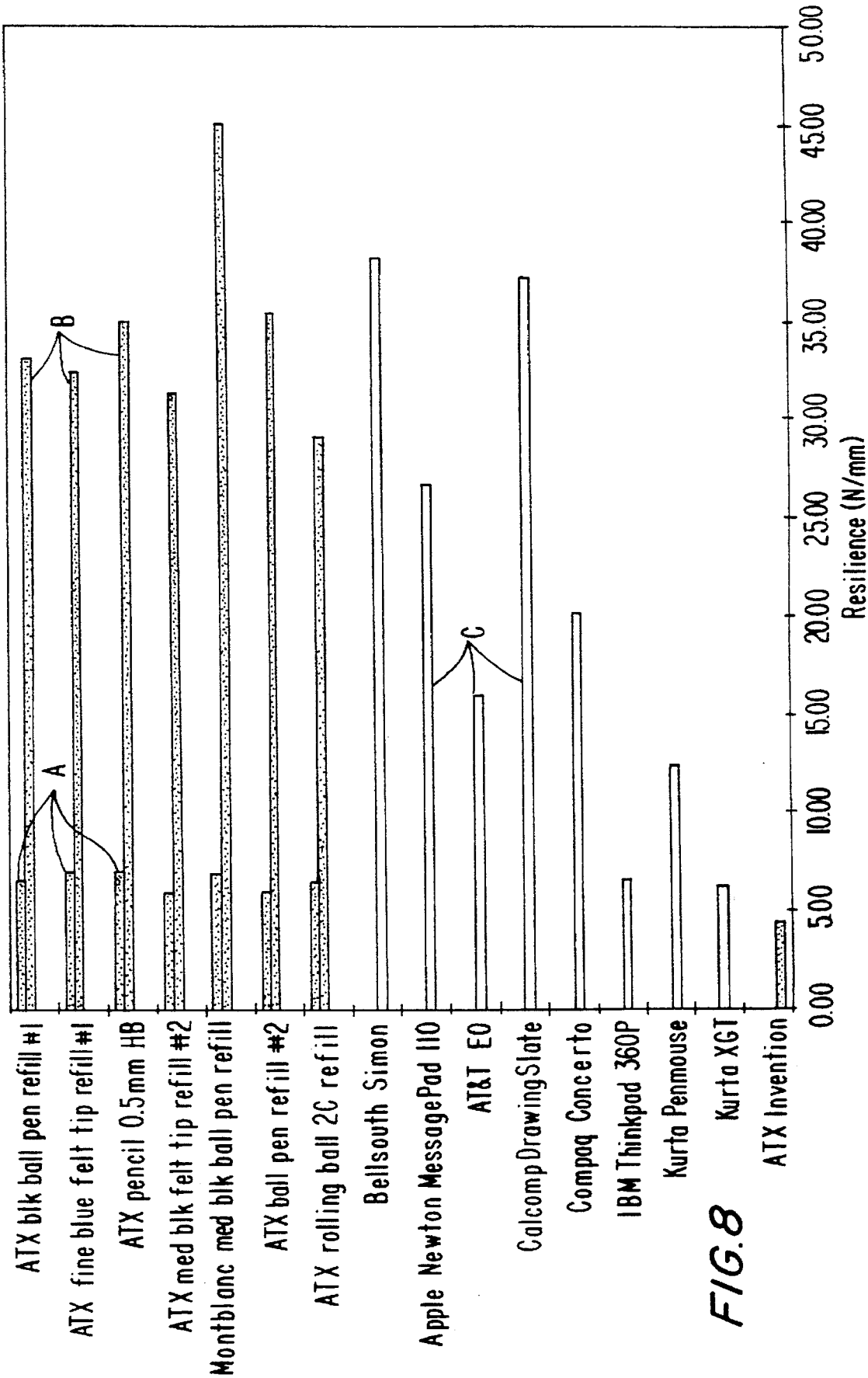
FIG. 8 is a bar graph illustrating the results of resilience tests conducted with various writing instruments on three different surfaces.

FIG. 8 shows the results of testing resilience of conventional writing instruments (ATX means A.T. Cross Company) and electronic writing devices. In these tests, the writing instruments were pushed vertically downward onto the writing surface following another test procedure previously described. The force required is measured and a spring constant computed. A number of conventional writing instruments were tested on two different writing surfaces. The two surfaces used were A) a sheet of 20 lb bond paper on a conventional pad of paper (A in FIG. 8) and B) a sheet of 20 lb bond paper on a block of aluminum (B in FIG. 8).

The figure shows that all the conventional writing instruments on the pad exhibited a resilience in the range of 5–9 N/mm and all the conventional writing instruments on the aluminum block were in a higher range above 25 N/mm. At C, the results on computer tablets or PDA screens is shown. The last entry labelled "ATX Invention" was the results of a test with an A.T. Cross tip made of a ⅛" diameter ruby ball in a brass housing writing on PORON surface (#4701-05-30031-1637).

The resistance, acoustic and resilience characteristics of current digitizer products, personal digital assistants and laptop computers were measured. These data points are shown in FIGS. 6 and 7. None of the current products falls within both the resistance and acoustic ranges of the conventional writing instruments. Most of the current products also fall outside of the resilience range of conventional writing instruments.

Figure 9:
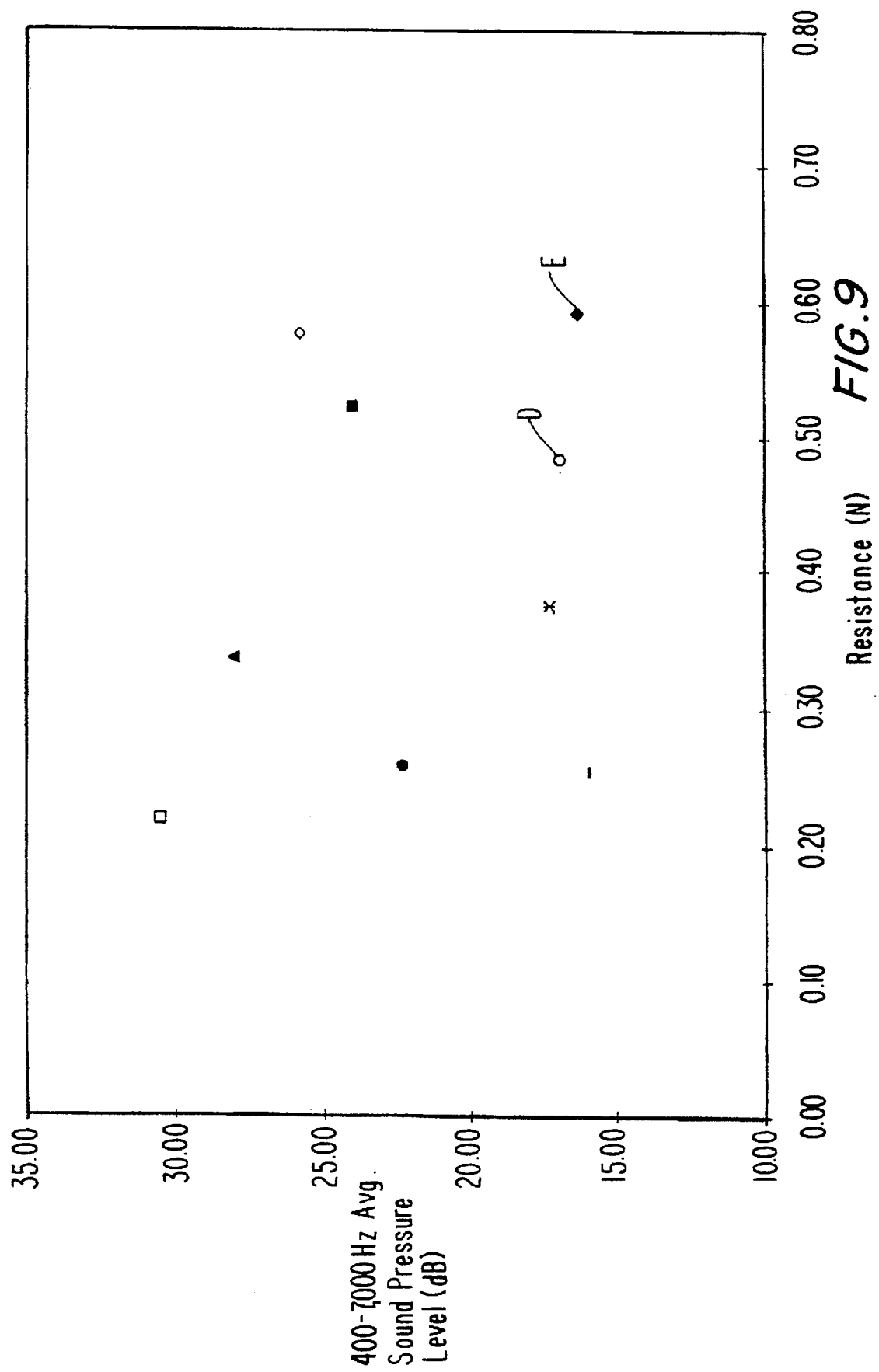
FIG. 9 is a scatter plot of writing resistance against acoustic level for various writing systems including a non-marking writing system of the present invention.

FIG. 9 shows, on a two-dimensional scatter plot, the results of measuring the resistance and the acoustics of the invention at D and conventional writing instruments at E. The resistance was measured as the pens were dragged across the writing surface while oriented vertically, following the test procedure using the device of FIG. 4. Two different conventional writing surfaces were used. The acoustic characteristics were measured following a test procedure to be described. It is seen that non-pencil, conventional writing instrument resistances are in the range of 0.4 to 0.7 N. It is seen that the pencils fall outside this range with lower resistance in the range of 0.2 to 0.4 N. The sound level produced by all systems is in the range 15 to 35 dB.

FIG. 9 also shows the location of the invention (at D) for those characteristics. These characteristics of the invention fall within the ranges of characteristics for the conventional writing instruments. A ball pen is at E.

Figure 10:
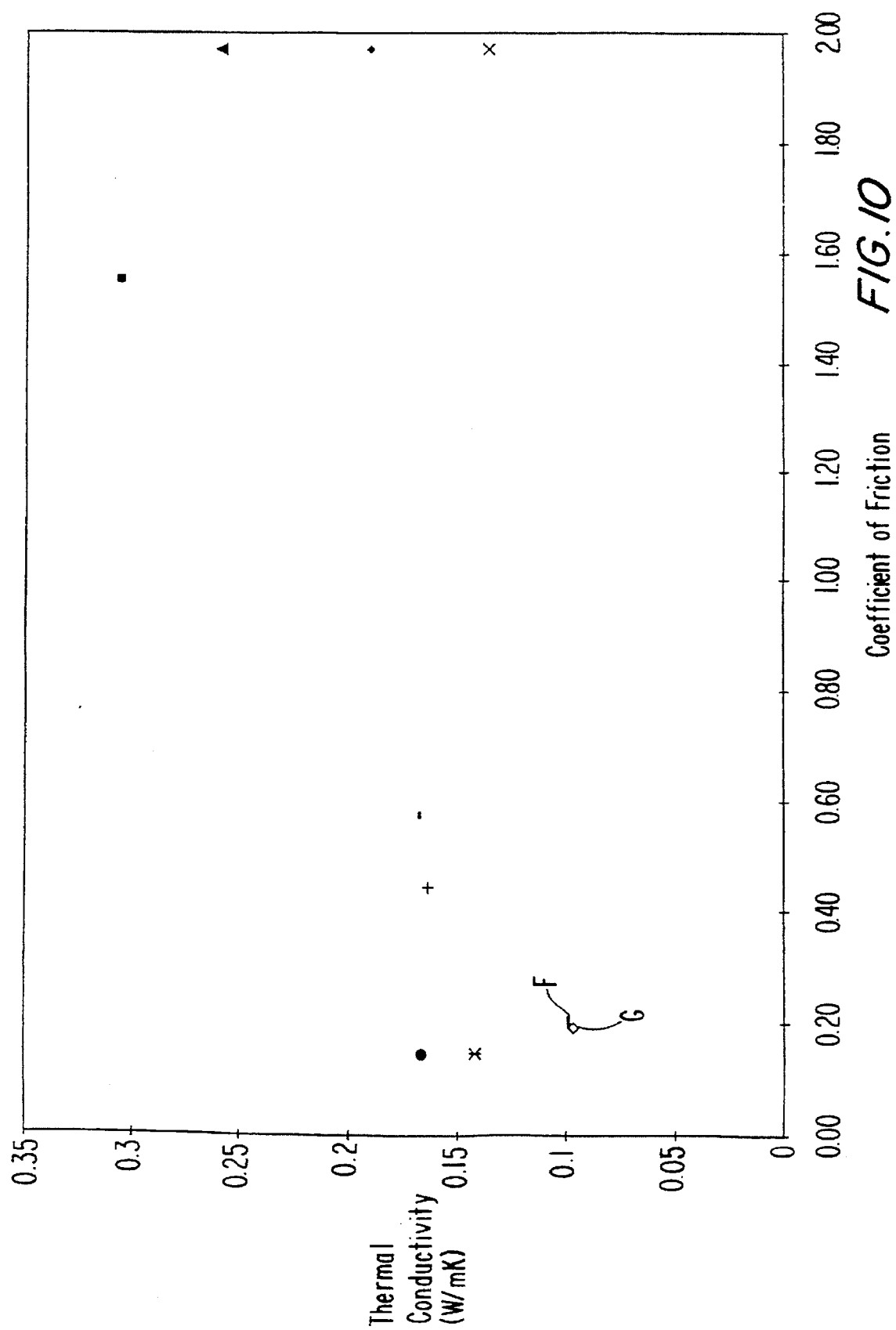
FIG. 10 is a plot similar to FIG. 9, plotting coefficient of friction against thermal conductivity, for various writing systems including the present invention.

FIG. 10 is a two dimensional scatter plot of writing surface thermal conductivity versus coefficient of friction. A high thermal conductivity means that the surface transmits heat well and will feel cool to the hand. A high coefficient of friction will make it hard to slide the hand across the surface. Writing surfaces of current digitizer products, the invention (at F), a conventional pad (at G) and other materials are displayed. It can be seen that not many materials are located in the same region as the conventional pad. Most existing products have surfaces which are sufficiently low in hand friction, yet higher in thermal conductivity than the pad of paper—they feel cooler and more slippery. Many materials were examined which have high thermal conductivity. The thermal conductivities of the inventive surface and the conventional writing surface are much closer than are those of the existing products to the conventional writing surface. Similarly, most existing products have different coefficients of friction.

In the course of the development of this invention, other materials and construction specifications were tried. Table 1 lists a number of materials which were found to be unsuitable for use as a writing surface for the stylus, as well as the results for PORON material and for paper.

TABLE 1

| | | Materials Properties | | | | |
|---|---|---|---|---|---|---|
| | | Thermal Conductivity | Friction μ | | | |
| Material | Durometer | W/mK | Static | | Dynamic | Comment |
| Silicone foam ⅟₁₆" | | | | | | |
| Blended sponge rubber (firm) ⅛" | 55–65 | o | 1.14 | o | 1.09 | o |
| White Buna-n ⅟₁₆" | 55–65 | | | | | |
| Standard SBR rubber ⅟₁₆" | 70–80 | | | | | |
| Natural latex 0.040 | 35–45 | − 0.136 − | >2 | + | >2 | + Lo durometer |
| Silicone rubber medium ⅟₃₂" | 50 | − | >2 | | >2 | + |
| Silicone rubber hard ⅟₃₂" | 70 | o 0.452 − | | | | Hi durometer |
| Gum rubber ⅟₁₆" | 30–40 | − 0.191 − | >2 | + | >2 | + Hi durometer |
| FDA Neoprene ⅟₁₆" | 50–60 | o − | 1.87 | + | 1.52 | + Hi friction and durometer |
| FDA vinyl/Nitrite ⅟₃₂" | 65–75 | o − | >2 | + | >2 | + Hi durometer |
| Buna-N medium ⅟₃₂" | 45–55 | o − | | + | | + Hi friction |
| Buna-N firm ⅟₃₂" | 55–65 | | | | | |
| Buna-N hard ⅟₃₂" | 65–75 | 0.259 − | >2 | + | >2 | + Hi friction and durometer |
| EPDM Rubber ⅟₃₂" | 55–65 | o − | >2 | + | >2 | + |
| Butyl rubber ⅟₁₆" | 55–65 | o − | >2 | + | >2 | + Hi friction |
| Neoprene firm ⅟₁₆" | 55–65 | o − | >2 | + | >2 | + Hi friction |

TABLE 1-continued

| Material | Materials Properties | | | | | | |
|---|---|---|---|---|---|---|---|
| | Durometer | Thermal Conductivity W/mK | | Friction μ | | | Comment |
| | | | | Static | | Dynamic | |
| Neoprene hard 1/16" | 65–75 | o | 0.306 | – | 1.57 | + | 1.47 | + | Hi durometer poor surface warmth |
| Neoprene spring rubber 1/16" | 65–75 | o | | – | | + | | + | Hi durometer poor surface warmth |
| Hypalon rubber 1/16" 15 | 60–70 | o | 0.282 | – | | | | | poor surface warmth |
| Poron | | | 0.099 | o | 0.20 | o | 0.18 | o | |
| Paper | | | 0.097 | o | 0.19 | o | 0.15 | o | |
| Glass Mylar | | | | | | | | | |
| Kurta PenMouse | | | 0.142 | – | 0.15 | o | 0.13 | o | |
| Kurta XGT | | | 0.167 | – | 0.15 | | 0.14 | | |
| BellSouth Simon | | | | – | 0.15 | | 0.14 | | |
| CalComp Drawing Slate | | | | – | 0.17 | o | 0.14 | o | |
| Compaq Concerto | | | | – | 0.12 | | 0.11 | | |
| Santoprene 203–50 | | o | 0.164 | – | 0.37 | o | 0.33 | o | |
| Santoprene 201–80 | | o | 0.168 | – | 0.58 | + | 0.55 | + | |

Under the friction headings, the symbols means: +=too high; o=good; and –=too low.

PORON material has a friction of 0.20 static and 0.18 dynamic, similar to paper (static 0.19, dynamic 0.15). Except for certain Kurta and other digitizer tablets, the other materials had coefficients of friction which were an order of magnitude larger, at least. The digitizer tablets have poor thermal properties compared to paper and PORON, but had sufficiently low friction (measured by use of a sliding block, not a human hand, which is the simulated property for Table 1). The natural latex rubber exhibited slightly lower thermal conductivity than the digitizer tablets, but still not nearly as close a match to the pad as was PORON. The ideal friction and thermal conductivity should simulate a hand sliding on paper, and the digitizers did not have that feel. PORON did.

The coefficients of friction of the materials in Table 1 versus stainless steel were determined using a procedure based on ASTM D1894-93.

A stainless steel sled was a 1.84" long (axis parallel to pull direction)×1.41" wide×0.46– thick block of stainless steel ground on the bottom side. The weight of the sled was 156 g. The sled was connected using monofilament line via є pulley as in FIG. 4 to the crosshead of the Zwick 1445 Universal Test Machine with 200 N load cell installed. The surface on which the sled was dragged was constructed of ¼" plexiglass sheet attached to an aluminum baseplate using double sided tape. The various test surfaces were attached to the plexiglass sheet using double stick tape or Scotch tape. The Zwick test machine was used to drag the steel block across the test surface at a speed of 0.5 ft/min for a distance of 2 inches (50 mm).

Procedure

1. The surface to be tested was mounted to the plexiglass sheet using double sided tape or Scotch tape.

2. The surface to be tested was cleaned with alcohol and allowed to dry.

3. The bottom surface of the steel sled was cleaned with alcohol and allowed to dry.

4. The sled was placed in contact with the test surface so that some slack remained in the monofilament line.

5. The crosshead was activated.

6. Steps 4–5 were repeated twice.

Both static and dynamic coefficients of friction were calculated based on the experimental data. In all the tests performed, it was observed that the static coefficient of friction was always greater than or equal to the dynamic coefficient of friction. Therefore, to determine the static coefficient of friction, the peak force of pulling the sled was used. This was divided by the sled weight to obtain the coefficient of friction.

The dynamic coefficient of friction was found by averaging the force data measured in a stable region after the initial peak force, if any. This average was divided by the sled weight to obtain the dynamic coefficient of friction.

The friction measured when testing many of the clean rubber materials was much higher than some of the other materials. The tribological behavior of these rubbers was changed dramatically by cleaning. After cleaning there was a very high coefficient of friction measured, almost an adhesion. In normal use, the surface of these materials would typically become coated with dust, dirt, finger oils, etc. which would greatly reduce this adhesion effect. Nonetheless, the disparity between the clean and dirty behavior of these materials as well as their high clean friction makes them undesirable for use as a surface on which to work.

In selecting a writing surface for a PDA, however, the primary concern is optical transparency to the LCD or other display screen. Due to the small size of these screens, the hand does not slide across the screen. The writing feel need not have the thermal and hand friction qualities, but must have the writing resistance quality and should have the sound quality. This can be achieved with a coating of transparent polyurethane elastomer or transparent silicone elastomer on the screen. With sufficient thickness, the resiliency of paper can also be achieved.

According to the invention thus, a selected physical writing operation, such as a ball-point pen on paper, is recreated with the invention by selecting the structure and material of the tip and writing surface to have characteristics that fall in the same range as the corresponding characteristics of the selected physical writing operation.

A non-rolling ball configuration was tested and found to produce too high a resistance on the resilient writing surface needed for the invention.

By employing a quantitative and directed approach, the research and development of the invention has led to the disclosed combination of materials and stylus construction which closely replicate the characteristics of a high quality conventional writing experience using a ball-point pen. The invention is distinguished from and improves upon existing products based on these quantitative parameters.

It is the interaction between the stylus or instrument tip and the writing surface which produces the desired characteristics. Therefore, permissible variations may include the migration of characteristic-producing features between the tip and surface.

For example, in the embodiment of FIG. 2, the resilience characteristic is derived wholly from the compliant writing surface. Note also that as the contact area between the pen tip and the complaint writing surface increases or decreases, then the compliance of the writing surface may have to increase or decrease respectively to keep resilience in the target range (e.g. a smaller ball will require a less resilient writing surface). In the embodiment of FIG. 3, a compliant element 32 is placed behind the tip assembly and a less resilient writing surface can be used. A different embodiment might place part of the compliance in the stylus and part in the writing surface or a combination may be used.

The invention is characterized by its quantifiable similarity to characteristics of a high quality, conventional writing experience. Variations in proportions or components which cause a similar system to be located within the same region of quality space as a high quality physical writing system are encompassed by this invention. Specific examples include: variation in ball diameter, changes in the material of the tip housing or ball material, and alternate geometries of the ball socket and retaining element.

The preferred embodiment of the invention replicates the experience of writing with a ball-point pen on a paper pad. Other embodiments, might, using alternate materials, replicate other writing experiences such as pencil on paper, crayon on paper, etc. For example, writing resistance could be increased by electing a material with a higher coefficient of friction for the ball or the ball housing. This might also be achieved by changing the geometry or size of the ball socket.

The socket material may be DELRIN (DuPont trademark for a type of acetal resin) or a similar lubricious plastic. Different materials may be chosen on the basis of compatibility with an electromagnetic digitizing pad, ease of manufacturing, cost or other reasons within the knowledge of the skilled artisan in this field.

The invention feels more similar to writing with a high quality pen than prior practice. It can reliably and measurably reproduce the experience of writing with a high quality inked writing system.

Since the parameters of a high quality writing experience have been identified, quantified and used to produce the invention, it is well-suited to manufacturing optimization and process control.

Another advantage of the invention is that the characteristics of arbitrary writing and painting systems (e.g. fountain pen, brush, pencil, etc.) can be measured and then replicated.

A further advantage of the invention is that it will have a longer, more consistent life than prior systems. Existing styli tend to wear down. They are, in fact, shipped with replacement stylus tips since this attribute is so widely recognized. As they wear, the writing characteristics of the stylus change.

Another characteristic of the embodiment of FIGS. 1–3 is that the ball be significantly smaller in diameter than the shank of the writing instrument, for example, the ball diameter should be at most about ¼ inch. It is also advantageous to utilize an axially symmetrical writing instrument, including the shank and ball, although offset and angled instruments are also contemplated as part of the invention. Further, while the shank is advantageously cylindrical, this is not a limitation of the invention since the shank of the writing instrument can take on different ergonomic shapes. Further, this can be with the ball at the axis of the instrument, or offset from the axis of the instrument.

The acoustic testing process was carried out as follows:

Calibrated sound pressure level measurements were made for several different writing systems in an anechoic chamber. A Brüel & Kjaer ½" condenser microphone was placed approximately 4 inches from the contact point of the writing instrument and the writing surface. A Brüel & Kjaer Type 2032 FFT analyzer was used to generate an average narrow band spectrum over a time period of approximately 30 seconds.

Initially, a comparison was made between two different mode of writing: continuous signature versus continuous figure-8's. Both tests were performed on a ¼" pad of 20 lb. paper, using an A.T. Cross ballpoint pen. The figure-8's produced a nearly identical spectrum to that produced by a continuous signature. Therefore, the figure-8 method was chosen as the standard acoustic stimulus since it compacts more writing into a smaller area. This feature is important for testing some of the writing tablets with small writing surfaces. In the tests, the writing instrument was lifted and reapplied to the writing surface between figure-8's. This was done to simulate the lifting of the writing instrument which occurs between words in normal writing.

Acoustic data are a function of time and frequency. The data, when averaged over a 30 second time window, are reduced to a function of frequency. The human auditory system does not respond to sound equally at all frequencies. At quiet to moderate sound levels, the ear is not very sensitive to frequencies above 10,000 Hz nor is it very sensitive to low frequency sounds.

There are a number of ways of comparing the acoustic data. For the purpose of this patent application, two have been chosen. The first is a direct comparison of the average spectrum of certain writing systems of interest. The second is an average of the sound pressure levels in the frequency range 400–7000 Hz. Although the single numbers produced in the second result are easier to manipulate and compare, they may not accurately characterize the sound. This is why a direct comparison of the spectra is also performed so that the spectral content of the particular noises may be compared.

Figure 14:
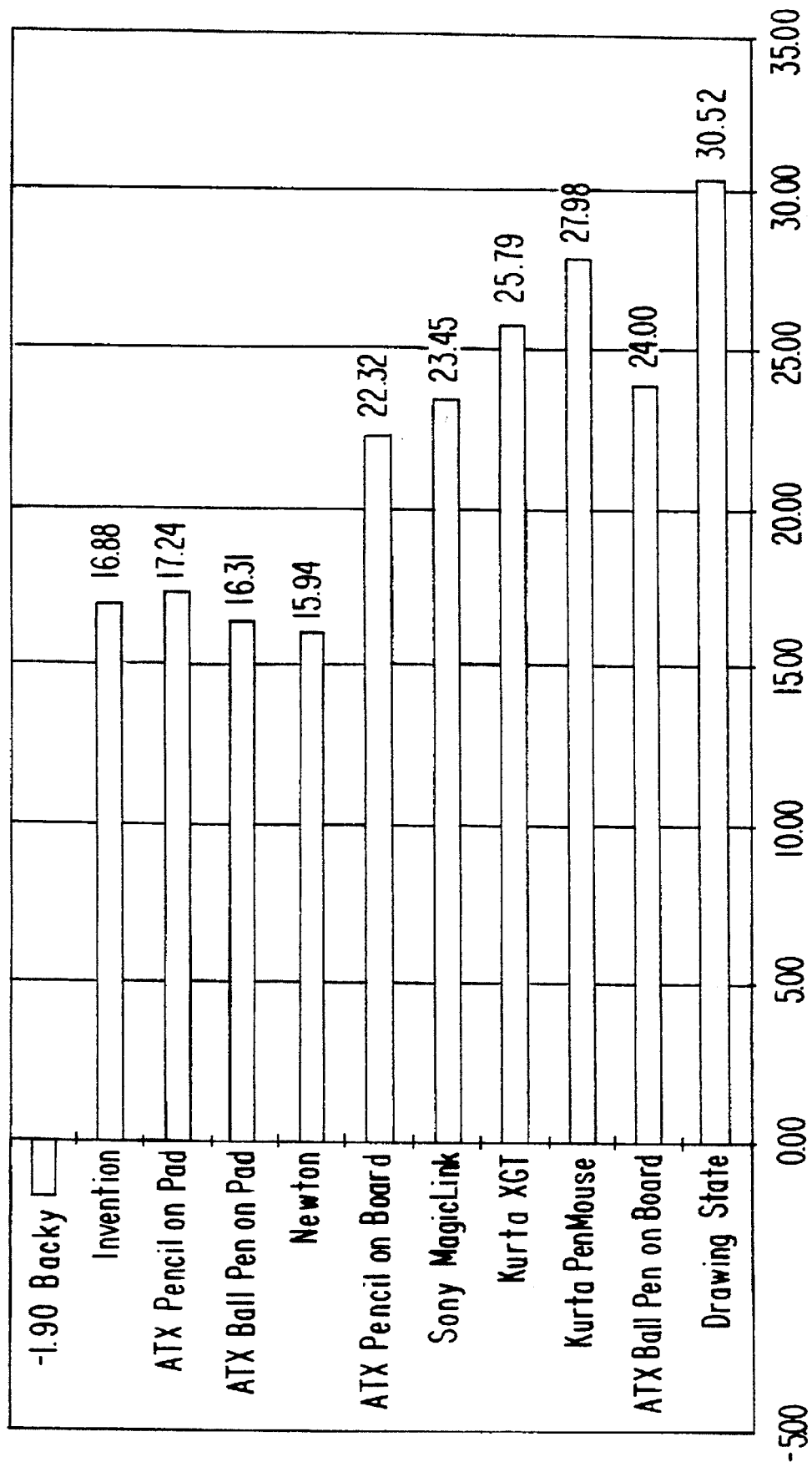
FIG. 14 is a bar graph illustrating the average sound pressure level in the range of 400 to 7000 Hz for various writing systems including that of the present invention.

FIG. 14 is a bar graph of the average sound pressure levels of the spectra of different writing systems in the range 400–7000 Hz, the frequencies to which humans are most sensitive for quiet to moderate sound levels. This figure shows that the invention has about the same average sound level as a ballpoint pen on a pad. The Kurta XGT is 9.5 dB louder than a ballpoint pen on a pad. To put this in perspective, a 10 dB increase in sound pressure level produces a resultant sound that is perceived as twice as loud.

Figure 15:
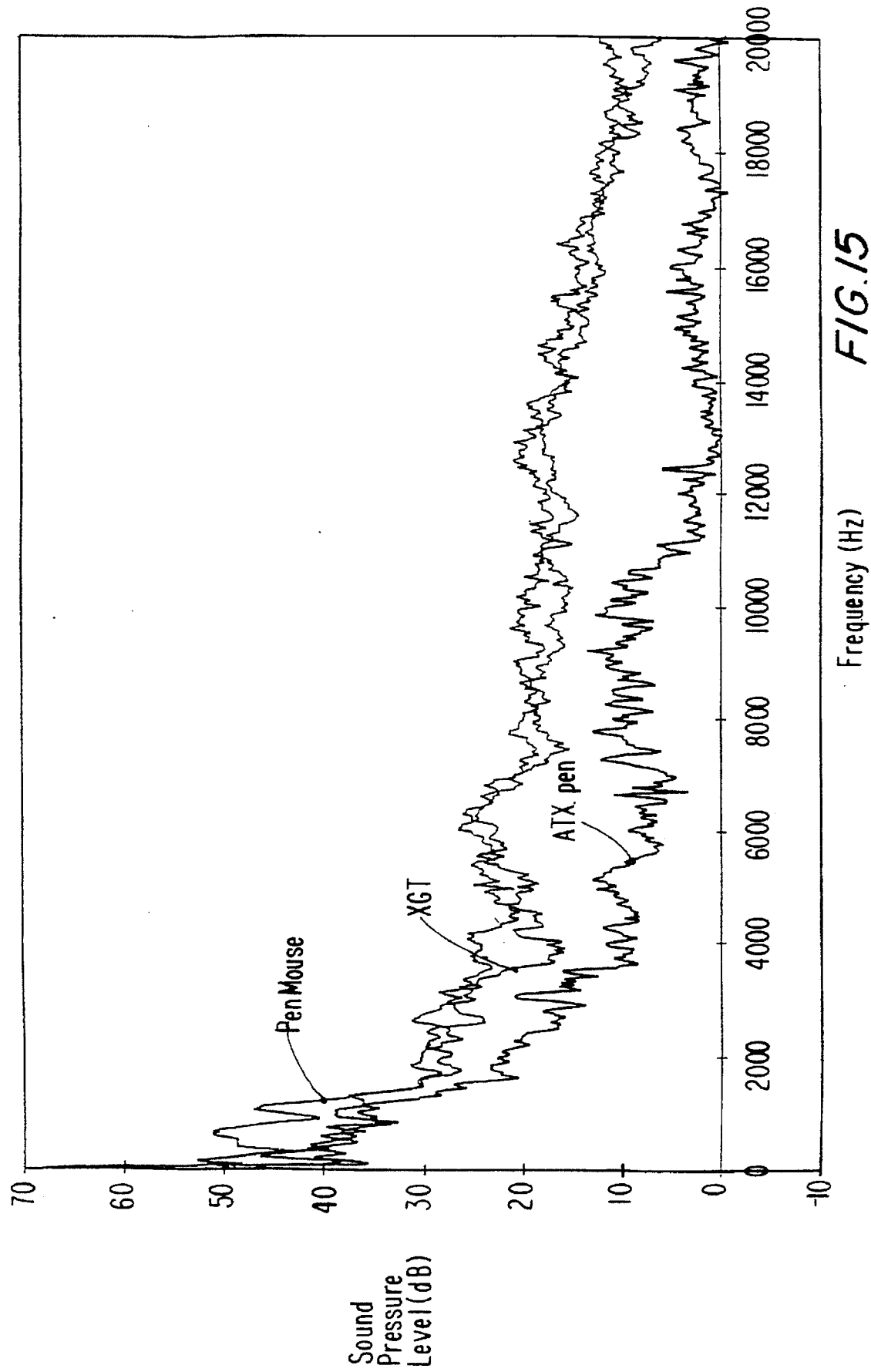
FIG. 15 is a graph plotting sound pressure level against frequency for three writing systems.

Besides the average sound pressure level, the sound spectra should be examined. FIG. 15 displays the spectra for a ballpoint pen, the Kurta PenMouse and the Kurta XGT. In the range from 1,500–3,800 Hz, the Kurta XGT is louder than the ballpoint pen. There is a peak in the XGT spectrum at 6,000 Hz.

Figure 16:
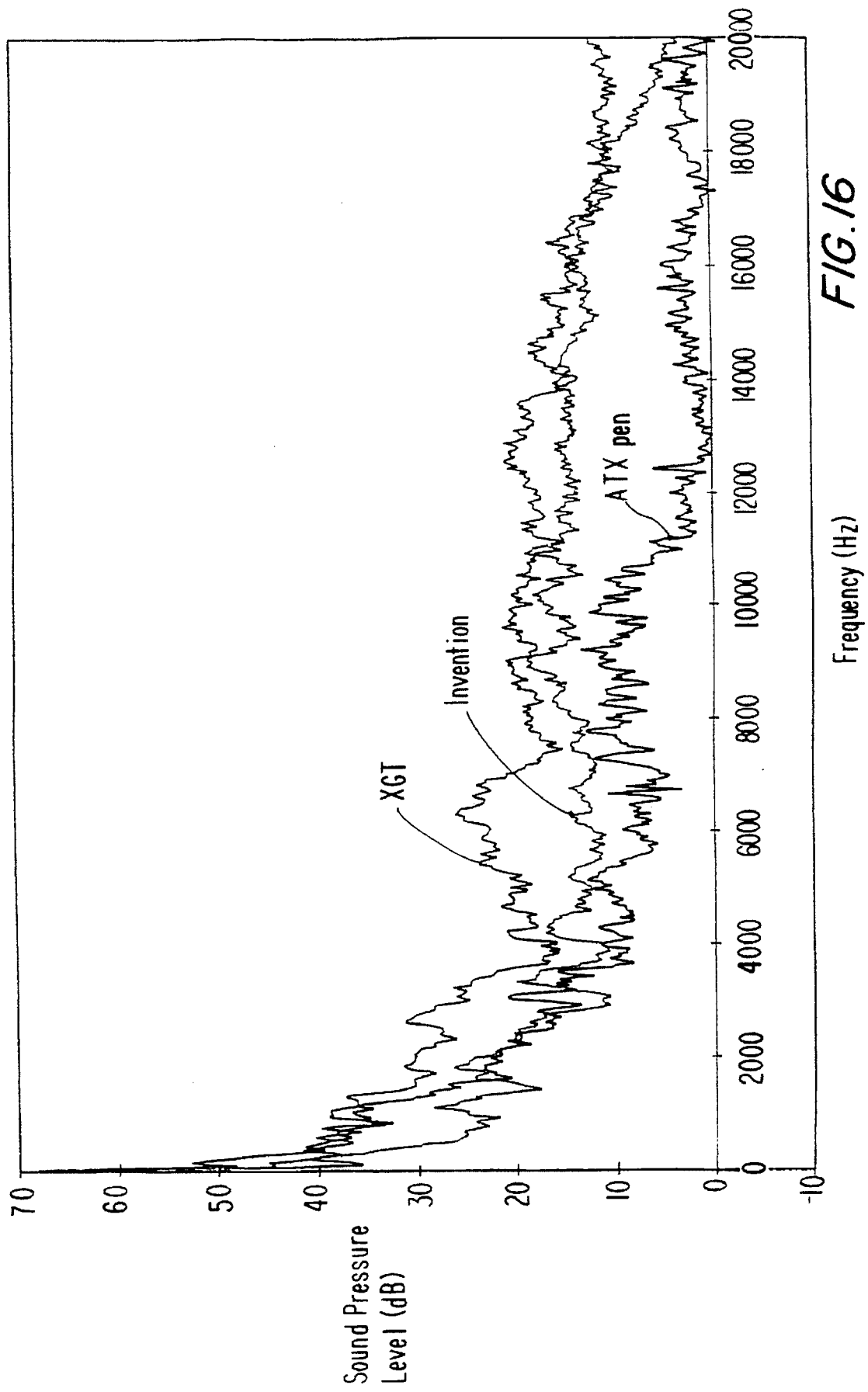
FIG. 16 is a view similar to FIG. 15 plotting the sound pressure levels of two writing systems and of the present invention.

The sound spectra of the invention, the Kurta XGT and a ballpoint pen are compared in FIG. 16. Here it is seen that the sound level of the invention is about the same as that of the ballpoint pen in the range of 2000–4000 Hz whereas the Kurta XGT is higher than them in this range. Below 2000 Hz, the invention is quieter than the ballpoint pen and Kurta XGT is about the same as the ballpoint pen. There is a significant peak in the Kurta XGT spectrum at about 6000 Hz. This is seen in neither the ballpoint pen nor the invention. Due to a spectral feature such as this peak, the average sound pressure level may understate the difference in sound perceived between the Kurta XGT and the ballpoint pen.

Figure 17:
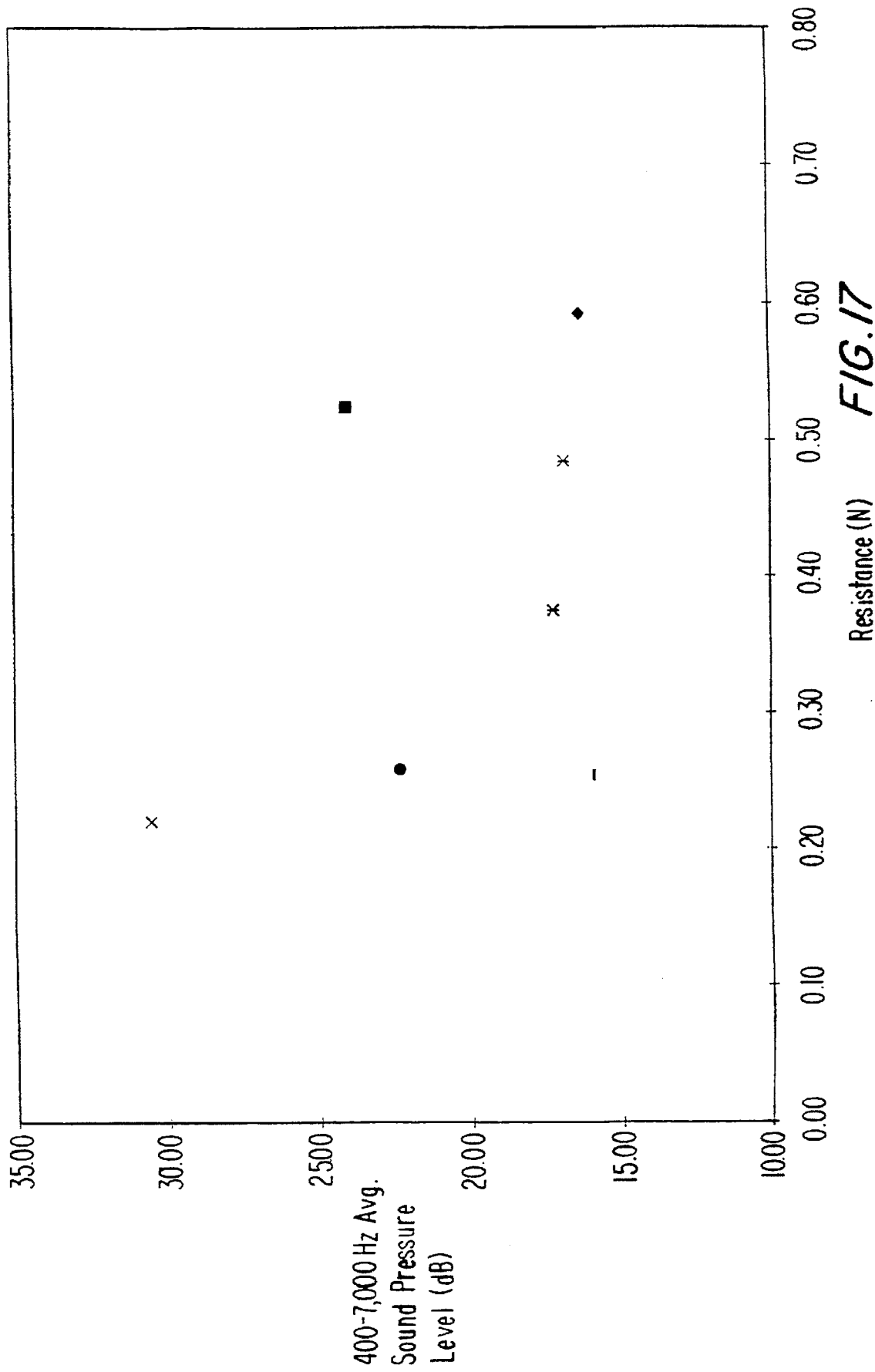
FIG. 17 is a graph plotting average sound level in the 400 to 7000 Hz range, against writing resistance for various writing systems including the present invention.

FIG. 17 is a graph of resistance versus average sound pressure level between 400–3000 Hz. Here it is seen that the invention is quieter and has a slightly lower writing resistance than the ATX ballpoint pen. The Kurta XGT is louder and has a similar writing resistance.

In FIG. 17, the quality writing experience region is defined as a resistance between 0.4 N–0.7 N and an average 400–7000 Hz sound pressure level below 22 dB. No existing electronic writing system falls within this region. The invention is in this region.

Figure 12:
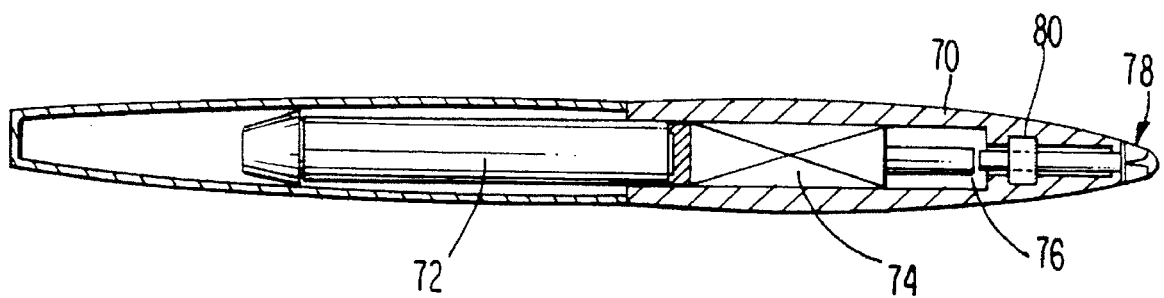
FIG. 12 is a sectional view similar to FIG. 1 of an active electronic stylus of the present invention.
Figure 13:
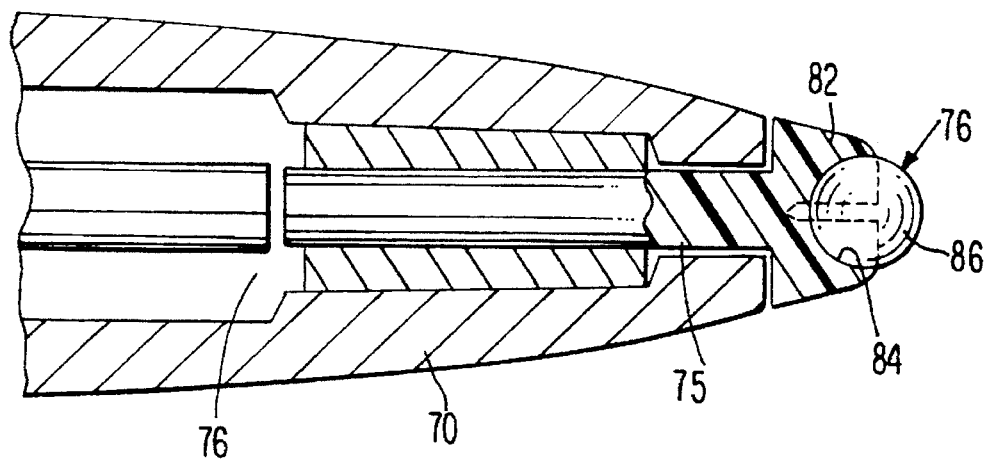
FIG. 13 is an enlarged sectional view of the non-writing tip of the stylus of FIG. 12.

Referring to FIGS. 12 and 13, another embodiment of the invention is an active electronic stylus having a body 70 with a forward end threaded to a rear end that together capture a battery 72 which drives electronic circuitry 74, of known design. The non-writing tip 78 of the present invention is connected to a contact switch 76 which activates circuitry 74 when the non-writing tip is touched to a writing surface. A coil or other electronic element 80 is also connected to the electronic circuitry 74 for interacting with an electronic device which is used in conjunction with the non-writing instrument.

As shown in FIG. 13, the cylindrical stem 75 of the switch 76 carries a housing 82 of the present invention which forms a capturing enclosure 84 with four fingers that embrace a dry, rolling, hard ball 76 for rolling on a writing surface but not marking the writing surface.

In certain types of electronic styli, specifically ones based on electromagnetic emission, it is a requirement that the inductive coil near the tip of the stylus not be magnetically shielded from the sensing circuitry in the digitizing pad. Further, the tip should not adversely affect the shape of the magnetic field produced by the inductive coil. This constrains the material and geometry of the materials which may be used in the tip.

An implementation of one of the preferred embodiments has been demonstrated at A.T. Cross Company and integrated into an electromagnetic stylus (based on Kurta KCP4 digitizer electronics). It has been demonstrated that the geometry and materials used in the invention are compatible with the performance requirements of the Kurta electromagnetic stylus. A pen tip comprised of a brass housing and a ⅛" diameter stainless steel ball was attached to a Kurta KCP4 electromagnetic stylus pen. This pen performed well on a Kurta PenMouse digitizer tablet covered with 0.031" PORON. No problems were observed with any of the pen functions in typical pen software applications (Fractal Design Dabbler, Microsoft Paintbrush).

Furthermore, it is believed that these pen design concepts can readily be extended to other electromagnetic technologies (e.g., Wacom, Calcomp, Summagraphics), as well as to electrostatic technology (e.g., Scriptel).

While specific embodiments of the invention have been shown and described in detail to illustrate the application of the principles of the invention, it will be understood that the invention may be embodied otherwise without departing from such principles.

What is claimed is:

1. A non-marking, writing system which simulates a selected physical writing system having characteristic ranges of writing resistance, sound, resilience and thermal conductivity, the non-marking writing system comprising:

a non-marking writing instrument having an elongated shank with opposite ends;

a non-marking tip connected to one end of the shank for engagement against and movement across a writing surface;

a writing surface onto and across which the tip is moved for non-marking writing under an actual writing resistance; and the tip being structured and made of selected material and the writing surface being made of selected material so that the actual writing resistance falls within the characteristic range of writing resistance for the selected physical writing system;

movement of the tip onto and across the writing surface producing sound, the system including selecting the structure and material of the tip and writing surface so that the sound falls within the characteristic range of sound of the selected physical writing system.

2. A system according to claim 1, wherein the tip is structured and made of selected material and the writing surface is made of selected materials so that the actual resilience of the tip against the writing surface during writing falls within the characteristic range of resilience of the selected physical writing system.

3. A writing system according to claim 1, wherein the material of the writing surface has an actual thermal conductivity which is selected to fall within the characteristic range of thermal conductivity of the selected physical writing system.

4. A writing system according to claim 1, wherein the tip comprises a housing and a ball rotating in the housing for rolling across the writing surface, the housing being made of material selected from the group consisting of brass and DELRIN, the ball being made of material selected from the group consisting of steel, semi-precious stone, hard plastic and ceramic, the housing being free of ink and the ball rotating directly against the housing without lubrication.

5. A writing system according to claim 1, wherein the sound is below about 22 dB at a frequency between about 400 to 7000 Hz.

6. A non-marking, writing system which simulates a selected physical writing system having characteristic ranges of writing resistance, sound, resilience and thermal conductivity, the non-marking writing system comprising:

a non-marking writing instrument having an elongated shank with opposite ends;

a non-marking tip connected to one end of the shank for engagement against and movement across a writing surface;

a writing surface onto and across which the tip is moved for non-marking writing under an actual writing resistance; and the tip being structured and made of selected material and the writing surface being made of selected material so that the actual writing resistance falls within the characteristic range of writing resistance for the selected physical writing system;

wherein the material of the writing surface has an actual thermal conductivity which is selected to fall within the characteristic range of thermal conductivity of the selected physical writing system.

7. A writing system according to claim 6, wherein the tip comprises a housing having an open end at the one end of the shank, and a dry ball mounted for rotation in the housing and at the one end of the shank.

8. A writing system according to claim 7, wherein the ball has a diameter which is at most about ¼ inch.

9. A writing system according to claim 8, wherein the shank is axially symmetrical.

10. A writing system according to claim 9, wherein the shank has an axis, the ball being positioned on the axis.

11. A writing system according to claim 7, wherein the ball is made of hard smooth material, the housing being made of softer slippery material so that the ball rotates with low friction in the housing and without lubrication.

12. A writing system according to claim 7, including a spring mounted between the housing and the shank for contributing to resiliency of the tip against the writing surface.

13. A writing system according to claim 7, wherein the ball has a diameter of from 0.010" to 0.250".

14. A non-marking, writing system which simulates a selected physical writing system having characteristic ranges of writing resistance, sound, resilience and thermal conductivity, the non-marking writing system comprising:

a non-marking writing instrument having an elongated shank with opposite ends;

a non-marking tip connected to one end of the shank for engagement against and movement across a writing surface;

a writing surface onto and across which the tip is moved for non-marking writing under an actual writing resistance; and the tip being structured and made of selected material and the writing surface being made of selected material so that the actual writing resistance falls within the characteristic range of writing resistance for the selected physical writing system;

the tip comprising a housing having an open end at the one end of the shank, and a dry ball mounted for rotation in the housing and at the one end of the shank, the ball is being made of hard smooth material, the housing being made of softer slippery material so that the ball rotates with low friction in the housing and without lubrication.

15. A non-marking, writing system which simulates a selected physical writing system having characteristic ranges of writing resistance, sound, resilience and thermal conductivity, the non-marking writing system comprising:

a non-marking writing instrument having an elongated shank with opposite ends;

a non-marking tip connected to one end of the shank for engagement against and movement across a writing surface;

a writing surface onto and across which the tip is moved for non-marking writing under an actual writing resistance; and the tip being structured and made of selected material and the writing surface being made of selected material so that the actual writing resistance falls within the characteristic range of writing resistance for the selected physical writing system, the actual writing resistance being within the range of about 0.4 to 0.7 N.

16. A writing system according to claim 15, wherein the structure and material of the tip and writing surface is selected to have an actual resilience of from about 5 to about 9 N/mm.

17. A writing system according to claim 16, wherein the structure and material of the tip and writing surface is selected so that an actual sound produced when the tip moves across the writing surface is below about 22 dB at a frequency between about 400 to 7000 Hz.

18. A writing system according to claim 15, wherein the writing surface is made of transparent material.

19. A writing system according to claim 18, wherein the transparent material is a coating on a computer screen adapted to be written on.

20. A writing system according to claim 19, wherein the coating is made of a material selected from the group consisting of polyurethane and silicone elastomers.

21. A non-marking, writing system which simulates a selected physical writing system having characteristic ranges of writing resistance, sound, resilience and thermal conductivity, the non-marking writing system comprising:

a non-marking writing instrument having an elongated shank with opposite ends;

a non-marking tip connected to one end of the shank for engagement against and movement across a writing surface;

a writing surface onto and across which the tip is moved for non-marking writing under an actual writing resistance, the writing surface being a transparent material coating on a computer screen adapted to be written on, the coating being made of a material selected from the group consisting of polyurethane and silicone elastomers; and the tip being structured and made of selected material and the writing surface being made of selected material so that the actual writing resistance falls within the characteristic range of writing resistance for the selected physical writing system.

22. A non-marking, writing instrument which simulates a selected physical writing system having characteristic ranges of writing resistance and sound, the non-marking writing instrument comprising:

an elongated shank with opposite ends;

a non-marking tip connected to one end of the shank for engagement against and for movement across a writing surface; and the writing instrument being structured and made of selected material so that an actual writing resistance caused by movement of the tip across a writing surface falls within the characteristic range of writing resistance for the selected physical writing system;

the structure and the material of the tip being selected so that the tip produces a characteristic range of sound which falls within the characteristic range of sound for the selected writing instrument.

23. A writing instrument according to claim 22, wherein the actual writing resistance is within the range of about 0.4 to 0.7 N.

24. A writing instrument according to claim 22, wherein the tip comprises a housing having an open end at the one end of the shank, and a dry ball mounted for rotation in the housing and at the one end of the shank.

25. A writing instrument according to claim 24, wherein the ball is made of hard smooth material, the housing being made of softer slippery material so that the ball rotates with low friction in the housing and without lubrication.

26. A writing instrument according to claim 24, including a spring mounted between the housing and the shank for contributing to resiliency of the tip against the writing surface.

27. A writing instrument according to claim 24, wherein the ball has a diameter of from 0.010" to 0.250".

28. A writing instrument according to claim 24, wherein the tip comprises a housing and a ball rotating in the housing for rolling across the writing surface, the housing being made of material selected from the group consisting of brass and DELRIN, the ball being made of material selected from the group consisting of steel, semi-precious stone, hard plastic and ceramic, the housing being free of ink and the ball rotating directly against the housing without lubrication.

29. A writing instrument according to claim 24, wherein the ball has a diameter which is at most about ¼".

30. A writing instrument according to claim 29, wherein the shank is axially symmetrical.

31. A writing instrument according to claim 30, wherein the shank has an axis, the ball being positioned on the axis.

32. A non-marking, writing instrument which simulates a selected physical writing system having characteristic ranges of writing resistance and sound, the non-marking writing instrument comprising:

an elongated shank with opposite ends;

a non-marking tip connected to one end of the shank for engagement against and for movement across a writing surface; and the writing instrument being structured and made of selected material so that an actual writing resistance caused by movement of the tip across a writing surface falls within the characteristic range of writing resistance for the selected physical writing system, the actual writing resistance being within the range of about 0.4 to 0.7 N.

33. A method of reproducing the feel of a selected physical writing system, while writing with a non-marking writing system comprising:

providing a non-marking writing instrument having an elongated shank with a non-marking tip connected to one end of the shank;

providing a writing surface onto which and across which the tip is moved for non-marking writing under an actual writing resistance;

measuring the actual writing resistance;

selecting the structure and material of the tip and writing surface so that the actual writing resistance falls within the characteristic range of writing resistance for the selected physical writing system; and selecting the structure and shape of the tip and writing surface so that sound is produced that falls within a characteristic range of sound produced by the selected writing system.

34. A method according to claim 33, including selecting an actual resilience of the tip on the writing surface to be within a characteristic range of resilience of the selected physical writing system.

35. A method according to claim 33, wherein the coating is selected from the group consisting of polyurethane and silicone elastomers.

36. A method according to claim 33, including forming the tip to comprise: a housing having an open end at the one end of the shank, and a dry ball mounted for rotation in the housing and at the one end of the shank.

37. A method according to claim 36, wherein the ball has a diameter which is at most about ¼.

38. A method according to claim 37, wherein the shank is axially symmetrical.

39. A method according to claim 38, wherein the shank has an axis, the ball being positioned on the axis.

40. A method according to claim 36, wherein the ball is made of hard smooth material, the housing being made of softer slippery material so that the ball rotates with low friction in the housing and without lubrication.

41. A method according to claim 36, including a spring mounted between the housing and the shank for contributing to resiliency of the tip against the writing surface.

42. A method according to claim 36, wherein the ball has a diameter of from 0.010" to 0.250".

43. A method according to claim 36, wherein the actual writing resistance is within the range of about 0.4 to 0.7 N.

44. A method according to claim 43, wherein the structure and material of the tip and writing surface is selected to have an actual resilience of from about 5 to about 9 N/mm.

45. A method of reproducing the feel of a selected physical writing system, while writing with a non-marking writing system comprising:

providing a non-marking writing instrument having an elongated shank with a non-marking tip connected to one end of the shank;

providing a writing surface onto which and across which the tip is moved for non-marking writing under an actual writing resistance;

measuring the actual writing resistance; and selecting the structure and material of the tip and writing surface so that the actual writing resistance falls within the characteristic range of writing resistance for the selected physical writing system, the writing resistance falling within the range about 0.4 N to about 0.7 N.

46. A method according to claim 45, including providing the writing surface to be transparent.

47. A method according to claim 46, including applying the writing surface as a transparent coating on a computer screen adapted to the written on with the non-marking writing instrument.

48. A method of reproducing the feel of a selected physical writing system, while writing with a non-marking writing system comprising:

providing a non-marking writing instrument having an elongated shank with a non-marking tip connected to one end of the shank;

providing a writing surface onto which and across which the tip is moved for non-marking writing under an actual writing resistance; measuring the actual writing resistance; and selecting the structure and material of the tip and writing surface so that the actual writing resistance falls within the characteristic range of writing resistance for the selected physical writing system, wherein the actual resilience is selected to be from about 5 to about 9 N/mm.

49. A method according to claim 45, wherein the writing surface is selected from the group consisting of polyurethane and silicone elastomers.

* * * * *